United States Patent
Uesugi et al.

[11] 4,199,227
[45] Apr. 22, 1980

[54] SHOCK RESISTANT LENS DEVICE WITH ZOOM AND MACROFOCUSING CONTROLS

[75] Inventors: Kyozo Uesugi, Sakai; Osamu Tanaka, Haskimoto, both of Japan

[73] Assignee: Minolta Camera Kabushiki Kaisha, Osaka, Japan

[21] Appl. No.: 915,110

[22] Filed: Jun. 13, 1978

[30] Foreign Application Priority Data

Jun. 14, 1977 [JP] Japan ................................. 52/69431

[51] Int. Cl.² .............................................. G02B 7/10
[52] U.S. Cl. ..................................................... 350/187
[58] Field of Search ........................................ 350/187

[56] References Cited
U.S. PATENT DOCUMENTS

| | | | |
|---|---|---|---|
| 3,752,565 | 8/1973 | Nagashima | 350/187 |
| 3,889,282 | 6/1975 | Hashimoto | 354/196 |
| 3,944,340 | 3/1976 | Hashimoto | 350/187 |

Primary Examiner—Jon W. Henry
Attorney, Agent, or Firm—Wolder, Gross & Yavner

[57] ABSTRACT

A lens barrel containing at least first and second movable lens groups and an operating member for shifting the movable lens groups along the optical axis includes a helicoid cylinder interposed between a first movable lens frame which supports the first movable lens group, and a fixed cylinder or a member whose movement relative to the fixed cylinder along the optical axis is prevented, whereby a shock externally imparted to the first movable lens frame is transmitted through the helicoid cylinder only to the fixed cylinder.

13 Claims, 8 Drawing Figures

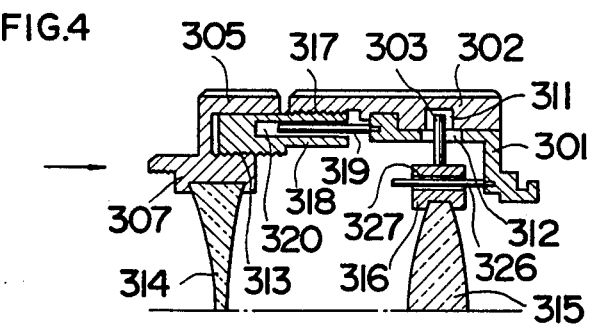
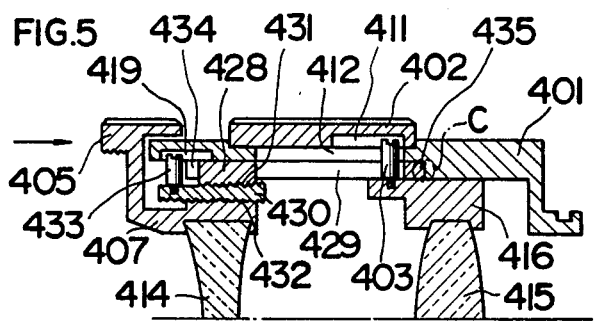
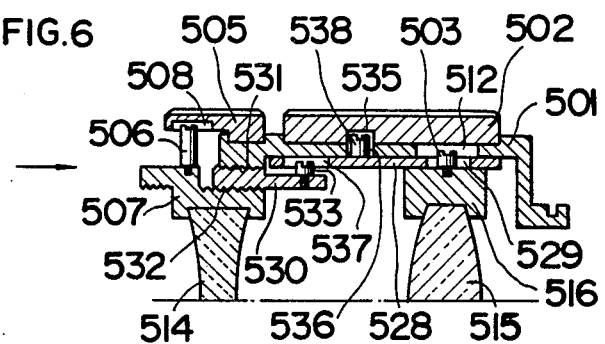

SHOCK RESISTANT LENS DEVICE WITH ZOOM AND MACROFOCUSING CONTROLS

BACKGROUND OF THE INVENTION

The present invention relates generally to an improved device for shifting lenses in a barrel to accomplish zooming and macro-focusing operations, in addition to a focusing operation, and it relates more particularly to a lens shifting device having improved shock resistance.

Hitherto, in lens barrels of the subject type, the axially movable frame for a lens group positioned on the side closest to an object, that is, the frontmost position in the lens system, like other movable lens frames, is so constructed as to be moved relative to a fixed cylinder by means of follower of coupling of pins and cam grooves. For this reason, when a shock or an impact is imparted to the movable lens frame, then the pins and cam grooves are likely to be damaged. For improving the shock resistance of the lens barrel and to overcome the aforesaid shortcomings, it has been proposed to provide on the fixed cylinder a protective lens barrel constructed to shelter the movable lens frames in a manner that the front movable lens frame does not project from the end of the lens barrel, with the overall length of the lens barrel including the protective lens barrel being constant, wherever two or more movable lens frames are moved along the optical axis due to a focusing operation or a zooming operation. Thus, the protective lens barrel protects the front movable lens frame, even when it moves to its frontmost position along the optical axis of the lens system.

For the above purpose, the protective lens barrel is so dimensioned as to project a considerable length. As a result, in order to ensure a sufficient angle of view and quantity of incident light, particularly in the case where the front movable lens frame assumes its most retracted position within the lens barrel, at least the front portion of the lens barrel including the protective lens barrel member must have a substantially large interior diameter. For this reason, the lens barrel for a lens system of the subject type must be of large diameter, as well as of great length, thus leading to an increase in size and weight. This necessarily leads to an increase in the diameters of lens barrel accessories such as color filters, polarizing filter and the like, with an accompanying increase in the cost thereof, and a loss or lack of interchangeability of the accessories between the instant lens barrel and other lens barrels.

SUMMARY OF THE INVENTION

It is accordingly an object of the present invention to provide a lens shifting device which affords high shock resistance for the lens barrel, and requires no bulky protective lens barrel member for sheltering the front movable lens frame, so that the overall lens barrel may be compact and light in weight, as compared with the lens shifting devices heretofore employed or proposed.

It is another object of the present invention to provide a shock-proof or shock absorbent lens shifting device which ensures an angle of view and sufficient incident light for photography, without increasing the diameter of the lens barrel.

According to the present invention, in a lens barrel mechanism including a movable lens frame holding a front lens group and movable along the optical axis for two functions, for example, for focusing and for zooming or macro-photography, the movable lens frame is coupled to the fixed barrel of the mechanism through a helicoid mechanism through which an external force applied to the movable frame is transmitted to the fixed barrel.

The above and further objects and novel features of the invention will more fully appear from the following detailed description when the same is read in conjunction with the accompanying drawings. It is to be expressly understood, however, that the drawings are for the purpose of illustration only, and are not intended as a definition of the limits of the invention.

BRIEF DESCRIPTION OF THE DRAWINGS

FIG. 4 is a schematic longitudinal cross section of a third embodiment of the present invention which is a modification of the first embodiment thereof;

FIG. 5 is a schematic longitudinal cross section of a fourth embodiment of the present invention;

FIG. 6 is a schematic longitudinal cross section of a fifth embodiment of the present invention;

DESCRIPTION OF THE PREFERRED EMBODIMENTS

Figure 1:
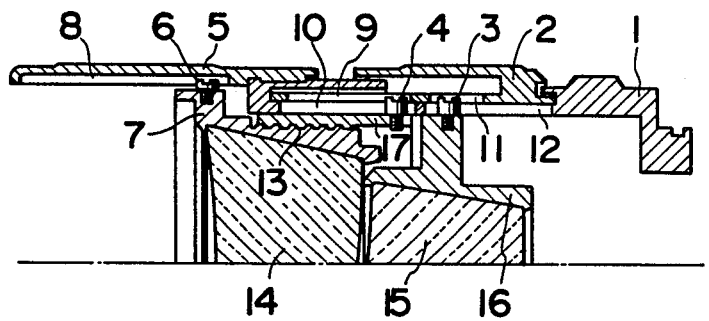
FIG. 1 is a schematic longitudinal sectional view of a prior art two-component type zoom lens barrel.

For a better understanding of the lens barrel and its advantages according to the present invention, the conventional barrel and lens adjusting mechanism for a two-component type zoom lens will be first explained with reference to FIG. 1. The conventional mechanism includes a zoom ring 2 which is rotatably fitted on a fixed cylinder 1 on the image or rear side of fixed cylinder 1 which is removably attached to a camera body by a suitable coupling. Zoom ring 2 is formed with a cam groove 9 which is provided in the front portion of the peripheral wall of ring 2, and with a cam 11 which is positioned in the rear portion thereof. A second movable lens frame 16 is fitted in fixed cylinder 1 and holds a second lens group 15. A follower pin 3 is provided on a second movable lens frame 16 and extends in the radial direction, through a linear groove 12 provided in fixed cylinder 1, and then into cam groove 11. A first movable lens frame 17 holds a first movable lens group 14 (only one being shown in the drawing) by way of a lens frame 7 and a helicoid 13. A pin 4 radially projects from first movable lens frame 17 and extends through a linear groove 10 provided in fixed cylinder 1 and then into cam groove 9.

A pin 6 provided on lens frame 7 is fitted in a linear groove 8 formed in a focus ring 5 which is rotatable relative to fixed cylinder 1 in a predetermined position on the optical axis thereof.

Accordingly, when focus ring 5 is rotated, then lens frame 7 is also rotated, so that lens frame 7 may be independently moved back or forth along the optical axis, by being guided by the lead provided in helicoid 13 for a focusing operation. When zoom ring 2 is rotated, then pin 3 is moved along the optical axis together with second movable lens frame 16, by being advanced and guided by cam groove 11 and linear groove 12, while pin 4 is moved along the optical axis together with first movable lens frame 17 being advanced and guided by cam groove 9 and linear groove 10, so that the first movable lens frame 17 shifts lens frame 7 coupled thereto through the medium of helicoid 13, and first movable lens group 14 along the optical axis for a zooming operation.

However, if a shock is imparted to lens frame 7 by an external force along the optical axis, then the shock is transmitted through helicoid 13 to first movable lens frame 17 and then directly to pin 4 and cam groove 9 damaging either one or both of pin 4 and cam groove 9.

Accordingly, in order to protect pin 4 and cam groove 9 from shock, it has been a general practice to provide focus ring 5 which projects forwardly from the barrel a considerable length to shelter lens frame 7, even if lens frame 7 is moved to its forwardmost position in a zooming or focusing operation, with the result that the shock is imparted to focus ring 5, rather than to lens frame 7, and then eventually to fixed cylinder 1.

In other words, since focus ring 5 is rotatable at a fixed position on the optical axis relative to fixed cylinder 1, even in case the lens frame is retracted rearwardly to any depth, the focus ring 5 still projects its full length. Thus, to ensure that incident light of a sufficient quantity for the first movable lens group and an angle of view suited for the lens system are achieved, it is a requirement that the diameter of the focus ring be increased, thus leading to the aforenoted shortcomings.

Figure 2:
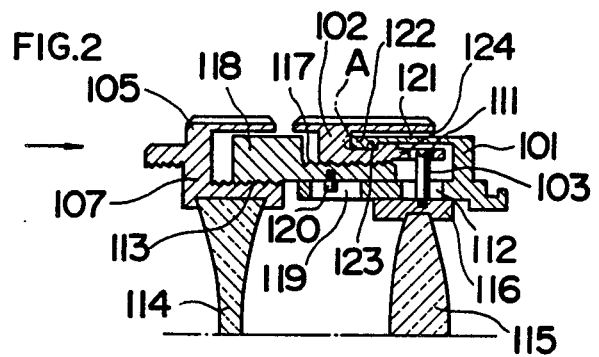
FIG. 2 is a schematic longitudinal cross section of a lens barrel according to a first embodiment of the present invention.

Considering now FIG. 2 of the drawings which illustrates a preferred embodiment of the present invention, reference numeral 121 generally designates an enlarged portion of U-shaped cross section formed on the rear outer peripheral surface of a fixed cylinder 101, provided with a rear camera mounting coupling, and in addition, enlarged portion 121 is formed with a forwardly projecting outer portion terminating in an inwardly directed annular lip 122. Furthermore, a linear longitudinal groove 112 is formed in the rear portion of the peripheral wall of fixed cylinder 101, and another linear groove 119 is provided in the forward portion of the peripheral wall of fixed cylinder 101.

Provided on the outer peripheral surface of a helicoid cylinder or sleeve 118 which slidingly engages the outer periphery of fixed cylinder 101 is a helicoid 117, and a radially inwardly directed pin 120 is located on the inner peripheral surface of helicoid cylinder 118. Pin 120 slidably engages linear groove 119. A zoom ring 102 has a helicoid on its inner peripheral surface which is in threaded engagement with the helicoid 117. Enlarged portion 121 engages a hollow annular portion of zoom ring 102, and annular lip 122 rotatably engages an annular groove or concave portion 123 provided in zoom ring 102, thereby allowing zoom ring 102 to rotate at a fixed longitudinal position on the optical axis of fixed cylinder 101. A projecting ring 124 integrally longitudinally rearwardly extending from zoom ring 102 is formed with a cam groove 111, that is a groove which extends both longitudinally and circumferentially.

First movable lens frame 107 is formed with a helicoid or screw thread which threadedly engages a helicoid or screw thread 113 formed on helicoid cylinder 118, and holds first movable lens group 114 thereon. First movable lens frame 107 is integral with a focus ring 105 and is of longitudinal U-shaped cross section whereby the front end portion of helicoid cylinder 118 registers therewith.

Second movable lens frame 116 slidably engages the inside face of cylinder 101 and holds second movable lens group 115. A radially outwardly projecting pin 103 provided on frame 116 extends through and slidably engages a linear groove 112 provided in fixed cylinder 101 and then slidably engages cam groove 111 provided in zoom ring 102.

With the above described construction, when focus ring 105 is rotated for a focusing operation, then focus ring 105 and first movable lens frame 107 are jointly moved back and forth along the optical axis relative to helicoid cylinder 118 by being guided by and rearwardly and forwardly advanced by the lead formed in helicoid 113, thereby accomplishing the focusing operation.

When zoom ring 102 is rotated for a zooming operation, second movable lens frame 116 is longitudinally advanced by cam groove 111 and guided by linear groove 112 so as to be moved along the optical axis, while helicoid cylinder 118, whose rotation is restricted due to the engagement of pin 120 with linear groove 119, is moved back and forth along the optical axis by being advanced by the lead formed on helicoid 117. At the same time, first movable lens frame 107, as well, which is coupled to helicoid 118 through the medium of helicoid 113, is moved back and forth, for accomplishing the zooming operation.

If a longitudinal shock is imparted to focus ring 105 and first movable lens frame 107 in the direction of the arrow, the shock is transmitted through helicoid cylinder 118 having helicoids 113 and 117 to zoom ring 102, and then to the end face or A portion of projecting portion 122 of fixed cylinder 101, rather than directly to pin 120 and linear groove 119 or pin 103 and cam groove 111.

Figure 3:
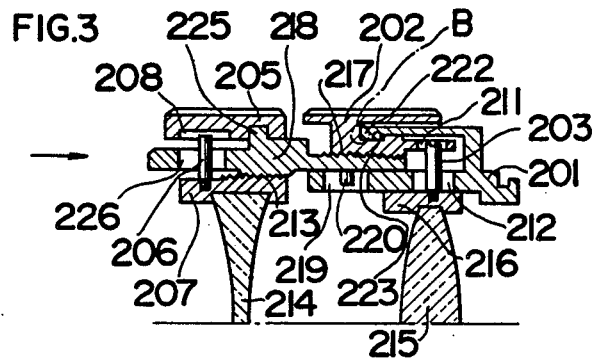
FIG. 3 is a schematic longitudinal cross section of a second embodiment of the present invention.

With the above described embodiment, focus ring 105 is integrally formed with first movable lens frame 107, while in the second embodiment the aforesaid members are separately provided, as shown in FIG. 3. The second embodiment is similar to the first embodiment in that: a fixed cylinder 201 is sleeve-coupled to a zoom ring 202, a helicoid cylinder 218 threadedly engages zoom ring 202 through the medium of a helicoid 217, and a pin 220 provided on helicoid cylinder 218 engages a linear groove 219 provided in fixed cylinder 201 so as to prevent the rotation of helicoid cylinder 218; second movable lens frame 216 holding a second lens group 215 slidably engages the inside face of fixed cylinder 201, and a radial pin 203 provided on second movable lens frame 216 extends through and slidably engages a linear groove 212 provided in fixed cylinder and then slidably engages a cam groove 211 provided in zoom ring 202; and fixed cylinder 201 engages zoom ring 202 through the medium of projecting portion 222 and concave portion 223 to restrict their relative axial movement.

Provided in the inner peripheral surface of focus ring 205 is an annular groove which is rotatably matingly engaged by projecting portion 225 provided on the outer peripheral surface of helicoid cylinder 218 which rotatably internally engages focus ring 205 and a linear groove 208. A pin 206 projecting in the radial direction from first movable lens frame 207 which holds first movable lens group 214 extends through a window 226 provided in helicoid cylinder 218 and then into slidable engagement with linear groove 208.

Accordingly, when focus ring 205 is rotated for a focusing operation, then linear groove 208 rotates first movable lens frame 207 through the medium of pin 206. However, helicoid cylinder 218 is prevented from rotation relative to fixed cylinder 201, by reason of pin 220 and linear groove 219, so that first movable lens frame 207 is independently moved back and forth relative to helicoid cylinder 218 by being guided and advanced or axially shifted by the lead of helicoid 213. In this case, even in case first movable lens frame 207 is moved back and forth, the entire length of the lens barrel is maintained constant.

When zoom ring 202 is rotated, the second movable lens frame 216, as in the case of the first embodiment, is moved along the optical axis jointly with second movable lens group 215 by being axially shifted by cam groove 211 and guided by linear groove 212, and the rotation of zoom ring 202 also causes helicoid cylinder 218, whose rotation is restricted, as has been described earlier, to be moved along the optical axis, by being shifted by the lead provided in helicoid 217 on cylinder 218, with the result that focus ring 205 which is coupled to cylinder 218 by means of projecting portion 255 is moved along the optical axis jointly therewith. At the same time, first movable lens frame 207, whose rotation is prevented relative to focus ring 205 by means of linear groove 208 and pin 206, is moved along the optical axis a distance equal to the displacement of helicoid cylinder 218, to which it is coupled by helicoid 213. As a result, upon zooming, the entire length of the lens barrel is varied by the distance which the first movable lens frame 207 is moved along the optical axis.

If a shock is imparted in the direction of the arrow to first movable lens frame 207, helicoid cylinder 218, or focus ring 208, then the shock is transmitted through projecting portion 225 to helicoid cylinder 218, and then through helicoid 217 and zoom ring 202, to an end force or B portion of fixed cylinder 201 which engages zoom ring 202. As a result, the shock is not directly transmitted to the shifting device for the first movable lens frame, which includes linear groove 208, window 226, and pin 206, or to pin 203 and cam groove 211.

With the first embodiment of the invention, either in the focusing operation or in the zooming operation, the entire length of the lens barrel varies a distance equal to the distance of the first movable lens frame moves along the optical axis, due to the earlier described operation.

The overall length of the lens barrel in the second embodiment varies a distance equal the displacement of first movable lens frame moved along the optical axis, only in the zooming operation, but is maintained constant in the focusing operation. However, even if a shock is imparted to focus ring 208, helicoid cylinder 208, or first movable lens frame 207, the shock is necessarily transmitted through helicoid cylinder 218 to fixed cylinder 201, so that the shock is eventually received by fixed cylinder 201.

The embodiment shown in FIG. 4 is a modification of the first embodiment shown in FIG. 2. Like in the first described embodiment, since a focus ring 305 is integral with first movable lens frame 307, either in a focusing operation or in a zooming operation, when first movable lens frame 307 is moved, then the length of the lens barrel is varied a distance equal to the displacement of first movable lens frame 307 thus moved.

The only difference between the first embodiment of FIG. 2 and the third embodiment of FIG. 4 is that there are provided means for preventing the rotation of helicoid cylinder 318 relative to fixed cylinder 301, and means for guiding the second movable lens frame 316 in a zooming operation.

Specifically, in the first embodiment, means for preventing the rotation of helicoid cylinder 118 relative to fixed cylinder 101 is provided by the linear groove 119 formed in fixed cylinder 101 and the pin 120 which slidably engages the groove 119 and projects radially from the helicoid cylinder 118. In contrast thereto, according to the modification thereof, there is provided a linear guide rod 319 which projects forwardly from fixed cylinder 301 parallel to the optical axis and a linear bore or groove 320 running parallel to the optical axis is provided in helicoid cylinder 318 in a manner to allow the sliding engagement of guide rod 319 therewith. In addition, a pin 303 provided on second movable lens frame 316 engages cam groove 311 provided in zoom ring 302, like in the first embodiment. However, unlike the first embodiment, pin 303 extends through a window 312 provided in fixed cylinder 310, and a linear guide rod 326 projects forwardly from fixed cylinder 301 parallel to the optical axis and slidingly engages a bore 327 extending through second movable lens frame 316 parallel with the optical axis.

Figure 7:
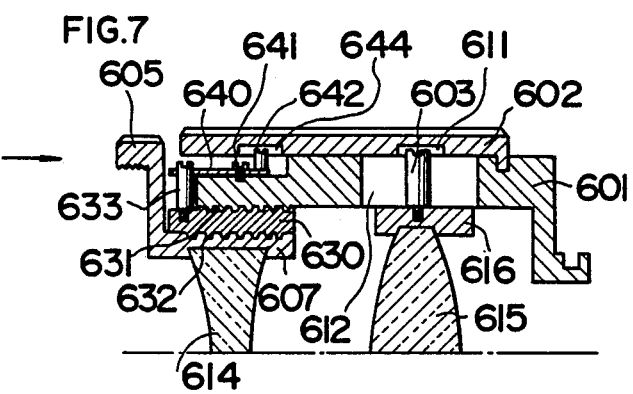
FIG. 7 is a schematic longitudinal cross section of a sixth embodiment of the present invention.

The fourth to six embodiments are shown in FIGS. 5 to 7. In the first to third embodiments, there are provided helicoid cylinders 118, 218, 318, which are helicoid-coupled to respective first movable lens frames, and the helicoid cylinders are coupled to the fixed cylinders by way of the zoom rings. In contrast thereto, according to the fourth to sixth embodiments, the aforesaid helicoid cylinders are directly coupled to respective fixed cylinders, not by way of the zoom rings, or indirectly coupled thereto.

Considering the fourth embodiment which is shown in FIG. 5, like the first and third embodiments, a focus ring 405 is integrally formed with a first movable lens frame 407. A zoom ring 402 is rotatably mounted on a fixed ring 401 in a fixed axial position. Fixed cylinder 401 is formed with a linear groove 419 in the front end portion of the inner peripheral surface thereof, and a linear slot 412 extending rearwardly of groove 419, in addition to a cam sleeve spring 428 provided on the inner peripheral surface thereof at a fixed axial position. A stop portion 434 projecting inwardly from the forward portion of cylinder 401 prevents cam ring 428 from shifting forwardly. In addition, the rearward movement of cam ring 428 is limited by a shoulder portion 435 formed on fixed cylinder 401. A cam groove 411 is provided in zoom ring 402, while a cam groove 429 is provided in cam ring 428, as well.

A second movable lens frame 416 which slidingly engages fixed cylinder 401 along the inner peripheral surface thereof holds a second movable lens group 415, and an outwardly radially projecting pin 403 is provided on the outer peripheral surface of lens frame 416. In addition, pin 403 extends through cam groove 429 provided in cam ring 428 and linear groove 412 provided in fixed cylinder 401, and then into a cam groove 411 provided in zoom ring 402.

A helicoid 432 is provided on the inner peripheral surface of helicoid cylinder 430 so as to threadedly engage helicoid 431 formed in the tip, inner peripheral surface of cam ring 428. A first movable lens frame 407 holding a first movable lens group 414 is of a horizontal U-shaped cross section, and is integrally formed with a focus ring 405. A pin 433 projecting radially outwardly from helicoid cylinder 430 slidably engages linear groove 419 provided in fixed cylinder 401.

When focus ring 405 is rotated in the fourth embodiment having the above described structure, first movable lens frame 407 and focus ring 405 are moved along the optical axis by being shifted by the lead of helicoid 432 relative to helicoid cylinder 430 whose rotation is prevented by means of pin 433 and linear groove 419.

When zoom ring 402 is rotated, second movable lens frame 416 is moved along the optical axis due to pin 403 being shifted by cam groove 411 and guided to linear groove 412. The movement of pin 403 along the optical axis causes cam ring 428 to be rotated under the influence of pin 403 in cam groove 429, so that helicoid cylinder 430 whose rotation is prevented by means of pin 433 and linear groove 419 is moved along the optical axis by being shifted by the lead of helicoid 431, so that the rotation of helicoid cylinder 430 causes first movable lens frame engaging helicoid 432 provided on helicoid cylinder 430 to move along the optical axis, together with focus ring 405.

If a shock is imparted to focus ring 405 and first movable lens frame 407 in the longitudinal direction of the arrow, the shock is transmitted by way of the helicoid cylinder and cam ring 428 to a shoulder portion C of fixed cylinder 401, thereby eliminating any danger of the shifting device including first movable lens frame, pin 403, cam groove 411 and cam groove 429 being damaged.

Like the first embodiment, the fourth embodiment is of such construction that either upon focusing or upon zooming, the length of the lens barrel is varied a distance equal to the displacement of the first movable lens frame along the optical axis.

According to the fifth embodiment of the present invention shown in FIG. 6, like the second embodiment, the first movable lens frame is provided separately from focus ring.

An axially fixed cylinder 501 is formed with a window 536 in its forward portion and a linear groove 512 in the rear thereof. A zoom ring 502 is rotatably supported on the outer peripheral surface of fixed cylinder 501 in a fixed axial position. Zoom ring 502 is provided with an engaging well 535 in register with window 536 and in opposed relation thereto.

A cam ring 528 which slidably engages fixed cylinder 501 along the inner peripheral surface thereof is formed with a cam groove 537 in its forward portion and a cam groove 529 in its rear portion. A radially outwardly projecting pin 538 provided on the outer peripheral surface of cam ring 528 extends through window 536, with some circumferential clearance therearound, and into engaging well 535.

First movable lens frame 507 which threadedly engages helicoid 532 provided on helicoid cylinder 530 holds first movable lens group 514, and an outwardly projecting radial pin 506 provided on the outer peripheral surface of first movable lens frame 507 slidably engages a linear groove 508 provided in a focus ring 505 which is rotatably mounted on fixed cylinder 501 at a fixed axial position.

When focus ring 505 is rotated, first movable lens frame 507 is rotated by means of a pin 506 and linear groove 508, and thus moved back and forth along the optical axis by being axially shifted by the lead provided on helicoid 532 relative to helicoid cylinder 530.

At such time, the rotational force of the first movable lens frame 507 acts on helicoid cylinder 530 with a tendency to rotate the same by means of the friction between first movable lens frame 507 and helicoid cylinder 530. However remarkably great friction in comparison with such friction exists between fixed cylinder and both the zoom ring 502 and cam ring 528, and such remarkable friction acts on helicoid cylinder 530 by way of pin 533 and cam groove 537 as the force preventing the rotatory movement of helicoid cylinder 530. Thus, only first lens frame 507 is rotated upon rotation of focus ring 505.

When zoom ring 502 is rotated, then cam ring 528 is rotated by means of the engaging well 535 and pin 538, with the result that second movable lens frame 516 is moved back and forth along the optical axis by being guided linear groove 512 and shifted by cam groove 529, while helicoid cylinder 530 is rotated by means of pin 533 along the cam groove 537 and shifted back and forth by the lead provided on helicoid 531. In addition, first movable lens frame 507 whose rotation is prevented by linear groove 508 and pin 506 is moved back and forth along the optical axis relative to helicoid cylinder 530 which is moved along the optical axis by being advanced by the lead on helicoid 532, thereby accomplishing a zooming operation.

If a shock is imparted to first movable lens frame 507 in the direction of the arrow, the shock is transmitted by way of helicoid 532, helicoid cylinder 530, and helicoid 531 to fixed cylinder 501, so that the lens shifting device such as cam groove 537 and pin 533, or cam groove 529 and pin 503 will not be damaged.

In the last described embodiment, even if the spacing between the movable lens groups is varied, the length of the lens barrel remains unchanged. In addition, even if a shock is directly imparted to first movable lens frame 507 which forwardly projects, the shock is transmitted through helicoid cylinder 530 to fixed cylinder 501.

Figure 8:
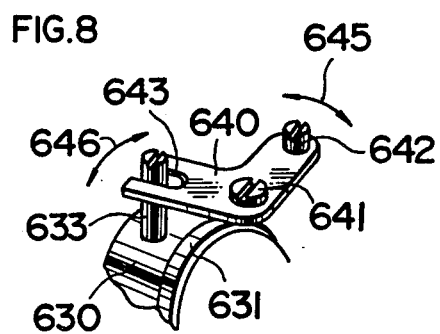
FIG. 8 is an enlarged perspective view showing the driving portion of the helicoid cylinder of FIG. 7.

The sixth embodiment shown in FIGS. 7 and 8 is somewhat similar to the last described fifth embodiment shown in FIG. 6. According to the fifth embodiment, cam ring 528 is rotated due to the rotation of zoom ring 502, and then the rotation of cam groove 537 causes helicoid cylinder 530 to rotate, so that helicoid cylinder 530 is moved by being forwardly or rearwardly advanced by the lead provided on helicoid 531, and then the movement of cylinder 530 is transmitted to the first movable lens frame 507. In contrast thereto, according to the sixth embodiment, the use of a member such as cam ring 528 is avoided, and hence the rotation of zoom ring 602 is transmitted to helicoid cylinder 630 by means of a lever 640 pivoted to a fixed cylinder 601.

As shown in FIG. 7, a zoom ring 602 is rotatably supported in a fixed axial position on the outer peripheral surface of fixed cylinder 601 having a linear groove 612. Zoom ring 602 is formed with a cam groove 644 in the forward portion thereof and a cam groove 611 in the rear thereof. A second movable lens frame 616 slidably engaging the interior face of fixed cylinder 601 holds a second movable lens group 615.

A radial pin 603 provided on second movable lens frame 616 extends through linear groove 612 and then into engagement with cam groove 611. A pin 642 is provided, as shown in FIG. 8, on a bell crank lever 640 which is rotatably supported at its knee by a pivot 641 located on fixed cylinder 601 and engages a cam groove 644 provided in zoom ring 602. A helicoid cylinder 630 which threadedly engages a helicoid 631 formed in the forward inner peripheral surface of fixed cylinder 601 is provided with a pin 633 extending in the radial direction, and a helicoid 632 formed on the inner peripheral surface of cylinder 630 threadedly engages first movable lens frame 607 supporting first movable lens group 614. The pin 633 provided on helicoid cylinder 630 slidably engages a linear groove 643 formed in the other outer end portion of lever 640.

When focus ring 605 is rotated, then first movable lens frame 607 is also rotated jointly therewith, and moved back and forth along the optical axis by being advanced by the lead provided on helicoid 632, thereby accomplishing a focusing operation.

When zoom ring 602 is rotated relative to fixed cylinder 601, then cam groove 611 causes second movable lens frame 616, whose rotation is prevented by linear groove 612, to move back and forth along the optical axis. In synchronism therewith, cam groove 644 provided in zoom ring 602 causes lever 640 to swing in the direction of arrow 645 in FIG. 8 by means of a pin 642, so that linear groove 643 provided in lever 640 is swung in the direction of arrow 646, so that linear groove 643 causes helicoid cylinder 630 to rotate by way of pin 633. As a result, helicoid cylinder 630 is moved back and forth along the optical axis relative to fixed cylinder 601, by being advanced by the lead provided on helicoid 631 for accomplishing a zooming operation.

If a shock is imparted to the focus ring 603 positioned at the front of the lens barrel in the direction of the arrow as shown in FIG. 7, then the shock is transmitted from first movable lens frame 607 via helicoid cylinder 630 to fixed cylinder 601, so that the shifting device consisting of pin 633, linear groove 643, lever 640, pin 642, and cam groove 644 or pin 603 and cam groove 611 are protected from damage.

The mechanism of the present invention has been described as applied to a two-component type zoom lens barrel. However, the present invention may be likewise applied to lens barrels of the three or more component type, and even to those in which zoom lenses are replaced by macrofocus lenses, with the obviation of any danger of the shifting device for the lenses being damaged. In any of the above described embodiments, an accessory attaching portion provided at the front of the lens barrel is so designed as to be rotatable. However, the provision of a stationary accessory attaching portion may be readily provided. Thus, in case it is not desired from a viewpoint of accuracy of eccentricity of respective movable lens groups that respective movable lens groups are rotated separately, the movable lenses should be interengaged by means of sleeves, so that the relative rotation among respective movable lens groups may be easily eliminated. In addition, the present invention is not limited to zoom lenses and the like, but may be applied to an automatic diaphragm adjusting mechanism and the like in which lenses are axially adjusted by a cam mechanism, for which a high shock resistance is required.

As is apparent from the foregoing, in the lens barrel according to the present invention, in which lenses are axially adjusted by a cam mechanism, a shock transmitted to a helicoid cylinder at the front of a lens barrel is received or carried by the helicoid cylinder, thereby eliminating any danger of damage being caused to the shifting device for the movable lens frame.

While there have been described and illustrated preferred embodiments of the present invention, it is apparent that numerous alterations, omissions and additions may be made without departing from the spirit thereof.

We claim:

1. A lens barrel for a lens system including first and second lens groups and having a common optical axis, comprising:
   an axially stationary cylindrical member coaxial with said optical axis and having a helicoid thread; an externally rotatable first operating ring;
   a first movable lens frame holding said first lens group and movable along the optical axis and having helicoid threads;
   a helicoid cylinder positioned between said first movable lens frame and said cylindrical member and having helicoid threads and threadedly coupled with said first movable lens frame and said cylindrical member through the helicoid threads;
   a first operating means for interconnecting said operating ring with said helicoid cylinder, and for moving said helicoid cylinder along the optical axis, when said first operating ring is rotated;
   a second movable lens frame holding and second lens group and movable along the optical axis;
   a second operating means for interconnecting said second movable lens frame with said first operating ring, so that said second movable lens frame is moved along the optical axis when said first operating ring is rotated; and
   an externally rotatable second operating ring associated with said first movable lens frame to move said first movable lens frame along the optical axis.

2. A lens barrel as set forth in claim 1, further comprising a rotationally and axially fixed cylinder, said cylindrical member being rotatable about the optical axis and being fitted in said fixed cylinder; and said first operating means including coupling means which integrally couples said rotatable cylindrical member to said first operating ring, and a guide mechanism for linearly guiding said helicoid cylinder along the optical axis, when said cylindrical member is rotated.

3. A lens barrel as set forth in claim 2, wherein said guide mechanism comprises a guide portion formed with said fixed cylinder and including a linear groove in the position opposing said helicoid cylinder, and a guide pin positioned on said helicoid cylinder and engaging said linear groove.

4. A lens barrel as set forth in claim 2, wherein said helicoid cylinder has a longitudinal guide bore extending parallel to the optical axis, said guide mechanism including a longitudinal guide bar located on said fixed cylinder and slidably engaging said guide bore.

5. A lens barrel as set forth in claim 1, wherein said lens barrel further includes a rotationally and axially fixed cylinder having a linear groove parallel to the optical axis, said cylindrical member being rotatable and located in and engaging said fixed cylinder along the inner peripheral surface thereof in a manner to be stationary along the optical axis but rotatable and having a cam groove, said first operating ring rotatably engaging the outer peripheral face of said fixed cylinder and having a cam groove in its inner peripheral surface, said second operating means including a radially projecting follower pin positioned on said second movable lens frame and engaging both said cam groove in said rotatable cylindrical member and said linear groove in said fixed cylinder; said first operating means including means for linearly guiding said helicoid cylinder along the optical axis when said helicoid cylinder is rotated, a radially projecting coupling pin engaging a cam groove in said first operating ring and said linear groove in said fixed cylinder and said cam groove in said rotatable cylindrical member, said coupling pin being formed integrally with said follower pin in the form of a head portion of said follower pin.

6. A lens barrel as set forth in claim 5, wherein said guide means includes a guide portion which is integrally formed with the front portion of said fixed cylinder and having a second linear groove extending parallel to the optical axis in a position confronting said helicoid cylinder, and a radially projecting guide pin positioned on said helicoid cylinder and engaging said second linear groove.

7. A lens barrel as set forth in claim 1, wherein said cylindrical member is rotationally fixed, said first operating means including a cam ring rotatably positioned in said fixed cylindrical member and rotatable with the rotation of said first operating ring, said cam ring having a first cam groove and a guide pin projecting radially from said helicoid cylinder and engaging said cam groove.

8. A lens barrel as set forth in claim 7, wherein said cam ring has a second cam groove longitudinally spaced from said first cam groove, said fixed cylinder having a linear groove extending parallel to the optical axis in a position opposed to said second cam groove on the optical axis, said second operating means including a radially projecting drive pin on said second movable lens frame engaging said linear groove and second cam groove.

9. A lens barrel as set forth in claim 1, wherein said cylindrical member is rotationally fixed, said first operating ring having a cam groove in its inner peripheral surface, said first operating means including a driven pin projecting radially from said helicoid cylinder and a bell crank lever pivoted to said fixed cylinder and including a first arm having a pin engaging said cam groove in said first operating ring, and a second arm coupled to said driven pin in a manner allowing it to slide parallel to the optical axis.

10. An adjustable lens device including first and second coaxial lens members, comprising a first sleeve member having first and second screw threads, a first collar member carrying said first lens member and having screw threads engaging said first screw threads whereby relative rotation of said first sleeve member and first collar member effects their relative axial movement, an axially stationary second sleeve member having screw threads engaging said second screw threads whereby relative rotation of said sleeves effects the axial movement of said first collar member, a second collar member axially spaced from said first collar member and carrying said second lens member, manually operable means for concurrently axially shifting said collar member and relatively rotating said first and second sleeves and means for independently rotating said first collar member relative to said first sleeve member.

11. The lens device of claim 10 wherein said second sleeve member is rotatable and including means restricting the rotation of said first sleeve member.

12. The lens device of claim 11 including a rotationally and axially stationary cylindrical base member rotatably supporting said second sleeve member.

13. The lens device of claim 10 wherein said second sleeve member is rotationally fixed.

* * * * *